(12) United States Patent
Wu et al.

(10) Patent No.: US 7,409,556 B2
(45) Date of Patent: Aug. 5, 2008

(54) HYBRID DIGITAL WATERMARKING FOR VIDEO AUTHENTICATION

(75) Inventors: Zhenyu Wu, Princeton, NJ (US); Xiao-Hong Yan, Princeton, NJ (US)

(73) Assignee: MY EZ Communications, LLC, Princeton, NJ (US)

( * ) Notice: Subject to any disclaimer, the term of this patent is extended or adjusted under 35 U.S.C. 154(b) by 888 days.

(21) Appl. No.: 10/717,069

(22) Filed: Nov. 19, 2003

(65) Prior Publication Data

US 2004/0131184 A1 Jul. 8, 2004

Related U.S. Application Data

(60) Provisional application No. 60/427,350, filed on Nov. 19, 2002.

(51) Int. Cl.
*H04L 9/00* (2006.01)

(52) U.S. Cl. .................. 713/176; 713/177; 713/180; 713/160; 713/168; 382/100; 380/46

(58) Field of Classification Search ......... 713/176–177, 713/168, 160, 180; 380/46; 382/100; 348/E5.108
See application file for complete search history.

(56) References Cited

U.S. PATENT DOCUMENTS 7,007,166 B1 * 2/2006 Moskowitz et al. ......... 713/176
7,142,691 B2 * 11/2006 Levy .......................... 382/100

* cited by examiner

*Primary Examiner*—Thanhnga B Truong
(74) *Attorney, Agent, or Firm*—F. Chau & Associates, LLC

(57) ABSTRACT

A hybrid digital watermarking system for video authentication includes an authenticated acquisition subsystem for digitally watermarking video data and a video management subsystem in signal communication with the authenticated acquisition subsystem for verifying the digitally watermarked video data, where the authenticated acquisition subsystem may include a watermarking device for applying each of an identity signature and a control signature to the video data within a hybrid digital watermark, and the hybrid digital watermark may achieve progressively varying robustness by means of error-correcting signature coding and/or rate-distortion guided bit embedding.

65 Claims, 13 Drawing Sheets

| Quantization number (QNO) | Class number | | | | Area number | | | |
|---|---|---|---|---|---|---|---|---|
| | 0 | 1 | 2 | 3 | 0 | 1 | 2 | 3 |
| 15 | | | | | | | | |
| 14 | | 15 | | | | | | |
| 13 | | 14 | | | | | | |
| 12 | | 13 | | 15 | | | | |
| 11 | | 12 | 15 | 14 | 1 | 1 | 1 | 1 |
| 10 | | 11 | 14 | 13 | 1 | 1 | 1 | 1 |
| 9 | | 10 | 13 | 12 | 1 | 1 | 1 | 1 |
| 8 | | 9 | 12 | 11 | 1 | 1 | 1 | 1 |
| 7 | | 8 | 11 | 10 | 1 | 1 | 1 | 1 |
| 6 | | 7 | 10 | 9 | 1 | 1 | 1 | 1 |
| 5 | | 6 | 9 | 8 | 1 | 1 | 1 | 1 |
| 4 | | 5 | 8 | 7 | 2 | 2 | 2 | 2 |
| 3 | | 4 | 7 | 6 | 2 | 2 | 2 | 2 |
| 2 | | 3 | 6 | 5 | 2 | 2 | 2 | 2 |
| 1 | | 2 | 5 | 4 | 4 | 4 | 4 | 4 |
| 0 | | 1 | 4 | 3 | 4 | 4 | 4 | 4 |
| | | 0 | 3 | 2 | 4 | 4 | 4 | 4 |
| | | | 2 | 1 | 8 | 8 | 8 | 8 |
| | | | 1 | 0 | 8 | 8 | 8 | 8 |
| | | | 0 | | 8 | 8 | 8 | 16 |
| | | | | | | 16 | 16 | 16 |
| | | | | | | 16 | 16 | 16 |

HYBRID DIGITAL WATERMARKING FOR VIDEO AUTHENTICATION

CROSS-REFERENCE TO RELATED APPLICATION

The present application claims the benefit of U.S. Provisional Application Ser. No. 60/427,350, filed Nov. 19, 2002 and entitled "Authentication of Mobile Video Recordings (MVRs) Based on Real-time Hybrid Digital Watermarking", which is incorporated herein by reference in its entirety.

BACKGROUND OF THE INVENTION

The present disclosure is directed towards digital watermarking, and in particular, towards digital watermarking of video data for authentication.

Mobile Video Recording ("MVR") data is typically collected by fleets of vehicles, such as patrol vehicles operated by law enforcement personnel, who record events involving contact with others during their course of duty. Due to the staggering personnel and logistical costs associated with operating current analog, non-indexing MVR systems, there is an overwhelming need for a computerized digital MVR system that is more effective and less costly to operate. However, deployment of digital MVR systems is hindered by authentication issues relevant to evidentiary requirements in courts of law, for example.

Currently, digital MVR storage may not be a legally acceptable storage medium due to its susceptibility to data alteration. Authentication is required to provide an effective means to safeguard the integrity of MVR content, which is essential for its legal acceptance.

MVR applications impose a set of stringent and conflicting requirements on the watermarking algorithm. Any successful algorithm must balance between the need to survive further compression and the sensitivity to detect intentional content tampering, and between speed for real-time marking and algorithm complexity to make counterfeit nearly impossible.

Robust watermarks are designed to withstand content-altering operations such as feature replacement, and their intended use is to claim ownership of digital content in spite of intentional alteration. They are generally not suitable for authentication, where the goal is to reject ownership in cases of content alteration. Fragile watermarks, which are used mainly for authentication purposes, tolerate none or very little change. Fragile watermarks are of little interest either for MVR authentication because they cannot survive lossy compression, an essential requirement in an MVR application. The kind of watermarks that match the MVR needs the closest are often referred to by some researchers as semi-fragile in order to distinguish them from fragile watermarks that tolerate little or no change.

Some watermarks have been designed specifically for video authentication, while others are applicable only to images. But they generally follow a common design principle, which is to find features that are mostly invariant to compression and then to embed watermark bits in the domain of these features. Many also use error-correcting coding ("ECC") to increase the safety margin of this invariance assumption.

Unfortunately, there are some performance limitations associated with such prior approaches. Firstly, features invariant to compression may be invariant to certain clever tampering as well. For instance, it has been found that the block averages stay mostly unchanged when video is compressed. Consequently, perturbation caused by compression will not likely alter watermark bits embedded in block averages and hence is not detected. However, any alterations that intentionally preserve block averages will not be detected either. Secondly, a delicate and often difficult balance must be reached between insensitivity to compression and sensitivity to tampering. Once the threshold for invariance is exceeded and thus the watermark extraction fails, there is little specificity about the causes for failure.

Accordingly, what is needed is a semi-fragile authentication system and method that enables the deployment of authenticatable digital MVR systems.

SUMMARY OF THE INVENTION

These and other drawbacks and disadvantages of the prior art are addressed by a system and method of Hybrid Digital Watermarking For Video Authentication. A hybrid digital watermarking encoder and decoder are provided for storing and retrieving signal data as a plurality of block transform coefficients.

A hybrid digital watermarking system for video authentication includes an authenticated acquisition subsystem for digitally watermarking video data and a video management subsystem in signal communication with the authenticated acquisition subsystem for verifying the digitally watermarked video data. The authenticated acquisition subsystem may include a watermarking device for applying each of an identity signature and a control signature to the video data within a hybrid digital watermark. In addition, the hybrid digital watermark may achieve progressively varying robustness by means of error-correcting signature coding and/or rate-distortion guided bit embedding.

In another exemplary embodiment, the video management subsystem is in intermittent signal communication with the authenticated acquisition subsystem for intermittently transmitting the digitally watermarked video data prior to verification.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches Hybrid Digital Watermarking For Video Authentication in accordance with the following exemplary figures, in which:

FIG. 5 shows a table of quantization step numbers ("QNO") in accordance with FIG. 3;

DETAILED DESCRIPTION OF PREFERRED EMBODIMENTS

Figure 1:
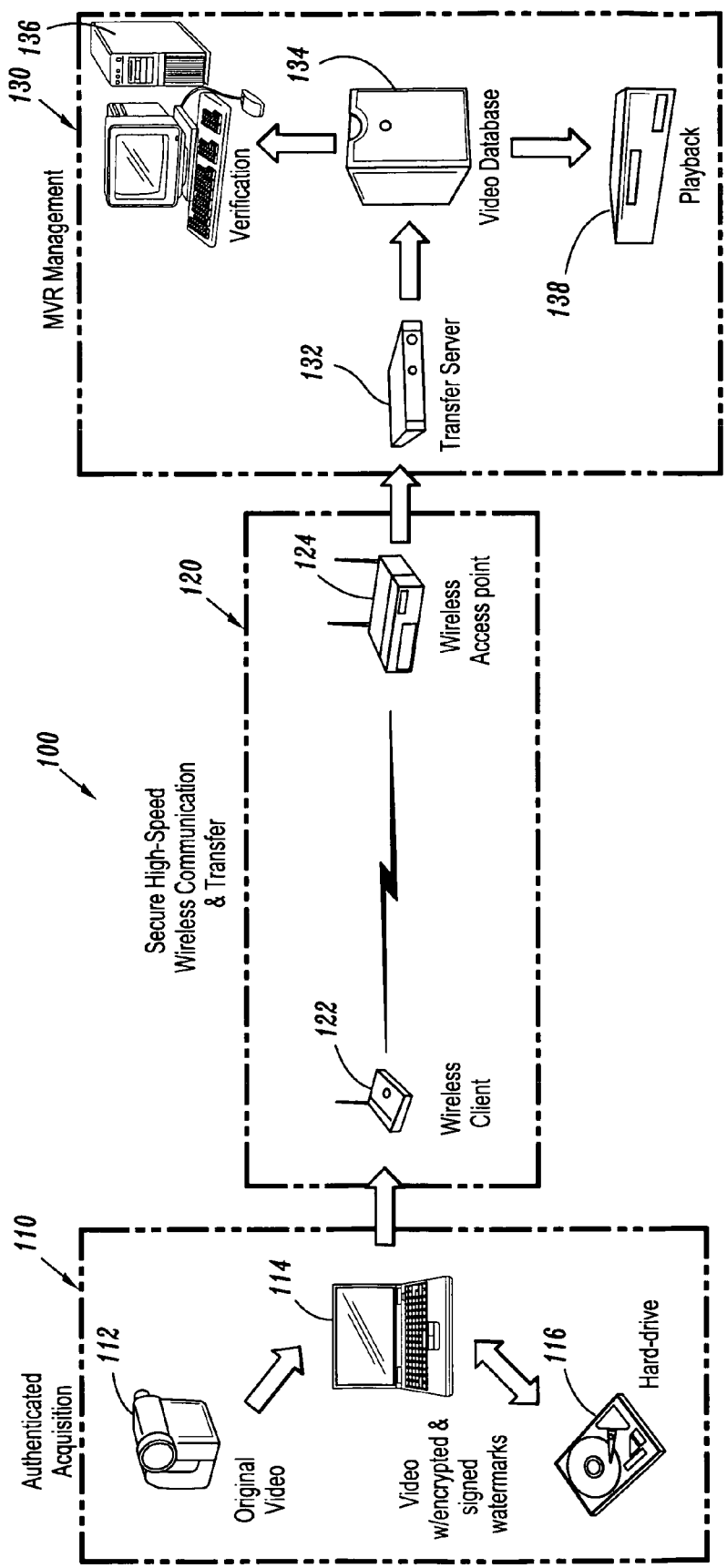
FIG. 1 shows a schematic diagram for an exemplary embodiment hybrid digital watermarking system for use with Mobile Video Recording ("MVR") data in accordance with the principles of the present disclosure.

The present disclosure describes a technique for real-time digital mobile video recording ("MVR") authentication using a novel hybrid-watermarking scheme, which integrates seamlessly with existing digital infrastructure.

An exemplary embodiment hybrid digital watermarking system includes real-time MVR authentication software that implements a hybrid-watermarking algorithm. This algorithm achieves progressively varying robustness in one single watermark by means of error-correcting signature coding and rate-distortion guided bit embedding. It combines the desirable features of fragile watermarks, which can localize content tampering, with those of robust watermarks, which can characterize the severity of content alteration.

The presently disclosed real-time digital MVR authentication system includes a novel hybrid-watermarking algorithm. Embodiments of this algorithm provide a secure and economical mechanism for safeguarding MVR content integrity that is minimally invasive to the daily routines of MVR users and administrators alike, and integrates seamlessly with existing digital infrastructure. A set of included features has been established for a preferred exemplary embodiment of this authentication algorithm to ensure its successful deployment among law enforcement agencies, for example. These exemplary features include real-time performance for on-the-fly watermarking during video acquisition; compression tolerance to provide a watermark robust enough to survive Motion Picture Experts Group ("MPEG") compression; tamper-detection where the watermark is fragile enough to detect content tampering; counterfeit-proofing where a content-dependent watermark is embedded; security where watermarks are encrypted using the public-key paradigm; and perceptual transparency where the watermark is invisible under normal observation.

Embodiments of the present disclosure, including the exemplary embodiment described herein, offer features and advantages that were impossible and/or extremely costly to obtain under the prior art. One significant benefit of exemplary digital algorithms involves the "indexing" of events for future retrieval purposes. In the conventional analog systems, the tapes are manually marked and dated, indicating the dates in which the tape was in use. If a tape was used over the course of ten days, any event captured during the ten-day period must be manually viewed to find the actual event sought to be shown.

With embodiments of the presently disclosed digital algorithm, every event is time and date stamped automatically, allowing for instant accessibility based upon the event being sought. This feature alone will alleviate countless hours involved in the review and duplication process, as well as significantly reduce the storage and maintenance requirements necessary for such MVR tapes.

In the exemplary embodiment, digital camcorders are installed in patrol vehicles, and MVR content related to each vehicle investigative stop is stored directly into an on-board computer's removable hard-drive and/or recordable DVD disk. A drive with a capacity of 60 GB is able to store about three hours of video in DV format, which is currently the standard output from many digital camcorders. Once the patrol is completed, the hard drive or DVD from the vehicle may be downloaded into a police station file server, for example.

The downloaded digital audio/video data may be further compressed from DV to MPEG format at the station server, if they are not already compressed by the on-board computer, and then electronically transmitted via a secured Intranet to a central server for archival. Once stored in the central server, the digital videos will be retrievable by those entities that have authorized viewing rights, and all requests for review of a video can be furnished via the Internet. This allows the receipt and review of these video events to be accomplished from the confines of remote offices by prosecutors and defense attorneys, as well as by law enforcement personnel involved in supervisory review of tapes and/or investigation of complaints. The number of personnel hours saved as a result of the deployment of this digital MVR solution is substantial.

An advantageous component of the presently disclosed exemplary digital solution, as it relates to reducing requirements for cost, bandwidth and storage, is MPEG compression. Standard DV format employs a simple frame-independent Discrete Cosine Transform ("DCT") based compression technique that achieves a constant combined video/audio data rate of about 36 Mbps. In contrast, sophisticated MPEG compression, which uses more elaborate encoding and motion compensation, is capable of reducing the streaming data rate to about 6 Mbps for broadcast-quality video. This is greater than about a 6-fold improvement in transmission speed and disk storage compared to DV format.

For example, MVR data for a vehicle stop lasting about 15 minutes occupies more than about 5 GB in DV format, while raw RGB would require more than about 25 GB of disk space. MPEG compression can reduce the storage amount to less than about 800 MB, which is small enough to fit into a single recordable CD for easy distribution. Keeping the infrastructure cost low is a beneficial feature of this two-step DV-MPEG compression scheme. High-end camcorders capable of directly outputting real-time MPEG signal are also available, but their relatively high cost is prohibitive for installing one in each patrol car. In addition, the full array of functionalities targeted at professional journalist is not required for an application where ruggedized low-end digital camcorders are desirable. Software based MPEG compression is considered to be a much more economical alternative given the currently available hardware.

Another beneficial feature of this preferred embodiment is that the hybrid-watermarked data may be eligible for acceptance under various State Archivists' guidelines. Currently, digital storage is not a widely acceptable storage medium due to its ability to be easily altered. Embodiments of the present disclosure have the potential to provide acceptable video data upon issuance of state court rulings upholding this algorithm as accepted by the courts as a true and accurate depiction of the original image and sound captured in this digital format. What might be called for is an authentication process that would involve, for example, a State's Division of Archive and/or Records Management, which would review the process to be employed in this digitalization of images and sound, as well as the method of storing the data. Once the process is reviewed and determined to be technologically sound by such entities, the legal aspects of authentication can proceed.

In the exemplary embodiment, as the MVR signal is being streamed out from the camcorder, its content is digitally watermarked in real-time, which eliminates any possibility for tampering of an unmarked MVR, and only the watermarked MVR is stored on disk. Properly watermarked video possesses a very high degree of content integrity. Content alteration, edit or scene cut will modify or destroy the embedded watermark, and watermark extraction would hence fail, and thereby indicate tampering. Watermarks can also be made extremely resistant to counterfeit-attacks. In other words, the watermark cannot be embedded into any other video without knowing the secret key associated with the watermark encryption. Another attractive property of watermarking is its non-intrusiveness and ease of use. An embedded watermark is invisible, and watermarked videos play just like normal ones except when their authenticity is being checked. In this case, the watermark is extracted and decrypted using the public-key. The paradigm of public-key and secret-key is widely used in encryption, and has been adopted in most watermarking applications.

Because the authentication information is embedded within the host MVR signal itself, it can be determined with confidence whether the authenticity of a distributed MVR copy has been compromised. With watermarking, the task of producing a certified copy for discovery purposes becomes very straightforward, and is as simple as copying and distribution.

Because watermarking is performed in real-time on the camcorder's output signal, it is efficient enough to keep up with a streaming data rate of at least about 36 Mbps. Another feature is MPEG compression resistance. Since MVR data is further compressed for archival and distribution, the embedded watermark is sufficiently robust to survive lossy MPEG compression. An additional feature is that it is substantially tamper-proof. At the same time, the embedded watermarks are fragile enough to detect any tampering of the MVR content. A further feature is it is substantially counterfeit-proof. It incorporates both spatial and temporal dependencies among blocks in terms of how and what to embed. Mere block-wise independent watermarking is too vulnerable to counterfeit attack. Another feature is security. Only encrypted watermarks are embedded in host video. The widely adopted public-key encryption paradigms, such as Pretty Good Protection ("PGP"), for example, may be used for watermark embedding and extraction. The watermark extraction depends exclusively on the public key associated with the watermark. One more feature is perceptual transparency. The embedded watermark is perceptually invisible under normal observation.

A feature that sets embodiments of the present disclosure apart from existing semi-fragile algorithms is the approach to perturbation on video content caused by compression. Instead of avoiding the detection of perturbation by means of invariant features, preferred embodiments work with them. Sequences of signature bits are embedded with different degrees of robustness in host video. Very few error-bits will be detected from the most robust sequence, and the number of error-bits will increase as the robustness of the associated sequence decreases. Because error-bits caused by compression are distributed randomly with a predictable correlation between sequences, the problem of distinguishing compression from other types of content alteration is one of statistical hypothesis testing based on the patterns of error-bit distributions. This single watermark with progressively varying robustness is achieved by means of both ECC of watermarking signature bits and rate-distortion guided bit embedding. It combines the ability of fragile watermarks to localize content tampering and that of robust watermarks to characterize the severity of content alteration. A possible prior hybrid approach may have used two watermarks, one robust and one fragile embedded consecutively, rather than the novel single watermark of the present disclosure.

Embodiments of the present disclosure use the DCT domain as the watermark-embedding domain. The output signal from digital camcorders is in DV format. In a simplified view, DV data consists of a stream of quantized and encoded discrete cosine transform ("DCT") coefficients of 8×8 pixel blocks from video frames traversed in a predetermined order. There exist compelling reasons to choose the DCT domain for watermarking embedding. A first reason is efficiency. Transformations of DV stream data into another domain for watermarking and then back to DCT are computationally demanding. A second reason is high embedding rate and robustness. Distributions of DCT coefficients tend to be much more predictable than pixel values. Good masking characteristics, particularly in low-frequency DCT coefficients, can be exploited to maintain high bit rate and robustness. A third reason is effective modeling of MPEG compression. Similar to DV compression, MPEG also works in the DCT domain from 8×8 pixel blocks in the YUV 4:2:0 color spaces. I-frames in MPEG are most similar to DV frames, despite differences in loss-less bit encoding schemes between MPEG and DV formats that can be ignored for authentication purposes because they have no effects on resulting watermarking characteristics. I-frames essentially re-encode the DCT coefficients from DV using different quantization scales. Requantization can be adequately described by a binary symmetric channel ("BSC"), which has been extensively studied in communication theory. Non-Intra frames, P and B frames, which also involve inter-frame motion compensation and prediction, are more difficult to model. But a BSC model can nevertheless provide a reasonable approximation for high-quality MPEG encoding.

The BSC model for DV-MPEG conversion has been validated and quantified. Specifically, DV-encoded MVR video is fed to an MPEG encoder, and the DCT coefficients before and after MPEG compression are compared. BSC quantification provides vital statistics for the design and parameterization of watermark signature encoding and embedding.

MVR watermarks according to the present disclosure may contain two signatures: control and identity. The identity signature is used to uniquely identify the event recorded in a video. It may include the patrol car ID, officer's badge number and a time stamp, and the MVR administrator will determine its exact format so that the information contained in the identity signature can be used for automated MVR indexing and search. The identity signature is encrypted using a secret key before being embedded. It is desirable for the identity signature to be robust in order to establish the identity of watermarked MVR and to indicate the presence of a watermark.

The control signature is specifically designed to facilitate the characterization of the type of modifications done to a watermarked MVR, and is of primary importance in the present disclosure. Characterization is emphasized rather than detection because it is known a priori that content modification will always be present after MPEG compression. What is of interest is the ability to tell whether the modification is compression-induced and "content-preserving", or is caused by "content-altering" changes, such as those resulting from tampering. Given the observation that MPEG compression of DV data can be modeled approximately as DCT coefficient re-quantization, it is reasonable to expect that compression-induced modification is random with small magnitude and distributes uniformly across all 8×8 DCT blocks. By modeling MPEG compression with a BSC, the problem of tamper-detection is one of statistical hypothesis testing, and the design goal of the control signature is to maximize the power of the underlying hypothesis test.

A small number of pseudo-random bits are generated and then encoded using a highly redundant error-correcting code with good multiple-error correction capability. The encoded bits are distributed and embedded in many DCT blocks. These embedded bits should be highly susceptible to MPEG compression; perhaps about 10 to 20% of the embedded bits would be erroneous. An accurate BSC quantification and distortion-rate guided bit embedding discussed later will allow tuning the bit-wise error rate to a desired range. Note that the ECC decoder will not only recover correctly the embedded long codeword, but also the bit positions where errors have occurred. Since the block in which each bit is embedded is known, the distribution of DCT blocks can be computed where error-bits have been detected. Under the null hypothesis, this distribution should be random and uniform. Statistically significant deviation from this expected pattern would raise suspicion of tampering, but would not be conclusive. This set of embedded EEC codes is denoted as the fragile control bits.

A second set of similarly generated ECC bits are also embedded in the DCT blocks. But this time the embedding is tuned to make these bits robust to MPEG compression. Under the null hypothesis, virtually no error bits should be detected. A small number of isolated error bits may not be statistically significant to indicate tampering. But spatially concentrated error-bits or error-bits correlating well with errors in the fragile control bits sequence would indicate strong evidence of tampering. This second set of embedded ECC codewords are referred as the robust control bits.

The composition of control bits and appropriate ECC candidates to encode them were investigated. Binary BCH codes exhibited excellent multiple-error correcting capability in the case of low bit-error rate, such as in the robust ECC control bits. However, simple repetition codes can have superior error-correction capability for high bit-error rates as in case of the fragile control bits.

Another feature of preferred embodiments is to use embedding schemes that meet the variable-robustness requirements set forth by the watermark signatures. A software embodiment for on-the-fly MVR video authentication provides for all of the listed exemplary features. As captured video is being streamed out from the camcorder, a sequence of encrypted digital watermarks is embedded on-the-fly within every single frame to protect its authenticity. Only watermarked data are stored to hard disk, thereby eliminating any possibility for tampering on unprotected digital video. Subsequent content alteration, editing, scene cutting or overlaying will modify or destroy the embedded watermark and cause watermark extraction to fail and thereby indicate tampering. Because the authentication information is embedded within the host video signal itself and is invisible, watermarked video plays normally except when its authenticity is being questioned.

The described exemplary embodiment includes the following features. It is capable of watermarking DV stream data at about 29.97 frames per second and 720×420 pixels per frame in real-time using a Pentium-4 laptop, for example. The embedded watermark includes an identity signature to establish the event identity, used for automatic event indexing, and a control signature, used to facilitate detection of tampering and counterfeit. Watermark signatures are encrypted using the public-key paradigm and embedded following content-dependent pseudo-random ordering based on invariant extraction.

Error-correcting signature coding and rate-distortion guided bit embedding are used for watermark robustness control. The watermark is tolerant to MPEG-2 compression, a popular storage format. Tamper-detection is carried out by a combination of detecting uncorrectable errors using BCH code and statistical hypothesis testing of spatial randomness for correctable error bits.

As shown in FIG. 1, an exemplary embodiment hybrid digital watermarking system for MVR authentication is indicated generally by the reference numeral 100. The system 100 includes an authenticated acquisition sub-system 110 in signal communication with a secure high-speed wireless communication and transfer sub-system 120, which, in turn, is in signal communication with an MVR management sub-system 130. The authenticated acquisition sub-system 110 includes a video imaging device or camera 112 in signal communication with a watermarking processor or computer 114, which includes a mass-storage device or hard-drive 116. The secure high-speed wireless communication and transfer sub-system 120, one of many possible means of downloading captured video data from the on-board computer to the station server, may include a wireless client 122 in signal communication with a wireless access point 124. The MVR management sub-system 130 includes a transfer server 132 in signal communication with a video database 134, which, in turn, is in signal communication with each of a verification processor or computer 136 and a watermark verifying playback unit 138.

Figure 2:
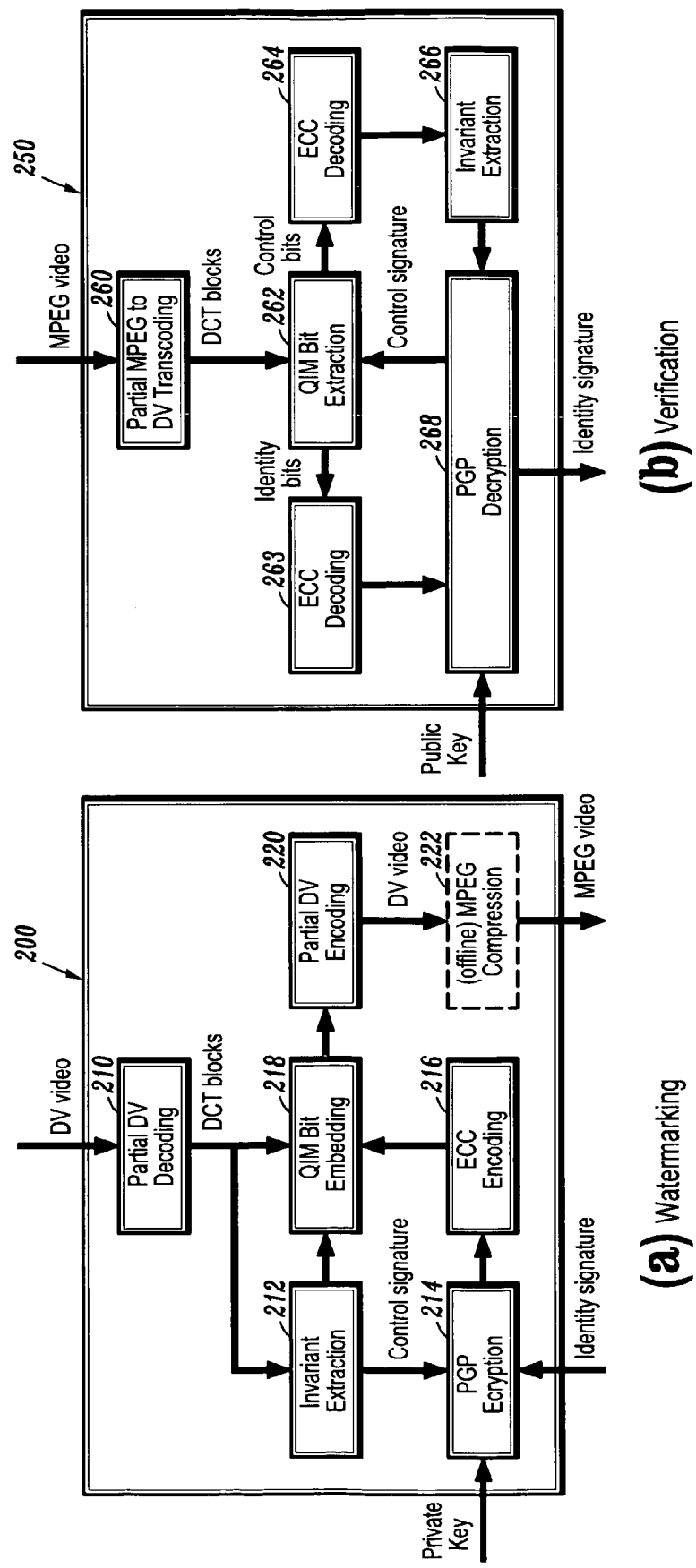
FIG. 2 shows data-flow block diagrams for watermark embedding and verification in accordance with FIG. 1.

Turning to FIG. 2, a watermarking system for implementation on the watermarking computer 114 of FIG. 1 is indicated generally by the reference numeral 200, and a verification system for implementation on the verification computer 136 of FIG. 1 is indicated generally by the reference numeral 250. The watermarking system 200 receives Digital Video ("DV") data at a unit 210, which performs partial DV decoding and outputs DCT blocks to units 212 and 218, respectively. The unit 212 performs invariant extraction, and outputs a control signature to units 214 and 218, respectively. The unit 214 receives a private key and an identity signature as external inputs, and passes data to a unit 216. The unit 216 encrypts the identity signature with the private key using an asymmetric encryption scheme, e.g. Pretty Good Protection ("PGP") encryption, performs Error Correcting Code ("ECC") encoding, and passes encoded data to the unit 218. The unit 218 performs Quantization Index Modulation ("QIM") bit embedding, and passes the embedded data to a unit 220. The unit 220, in turn, performs partial DV encoding, and passes DV video to an offline unit 222, which then performs MPEG compression and outputs MPEG encoded video data.

The verification system 250 includes a unit 260, which receives the MPEG encoded video and performs partial MPEG to DV transcoding to thereby output DCT blocks to a unit 262. The unit 262 performs QIM bit extraction, and outputs identity bits to a unit 263 and control bits to a unit 264, each of which performs Error Correcting Code ("ECC") decoding on their respective bits. The unit 264 passes decoded data to a unit 266, which performs invariant extraction and passes the extracted data to a unit 268. The unit 268 also receives the decoded identity bits from the unit 263, as well as an external public key, performs Pretty Good Protection ("PGP") decryption, and outputs an identity signature.

Figure 3:
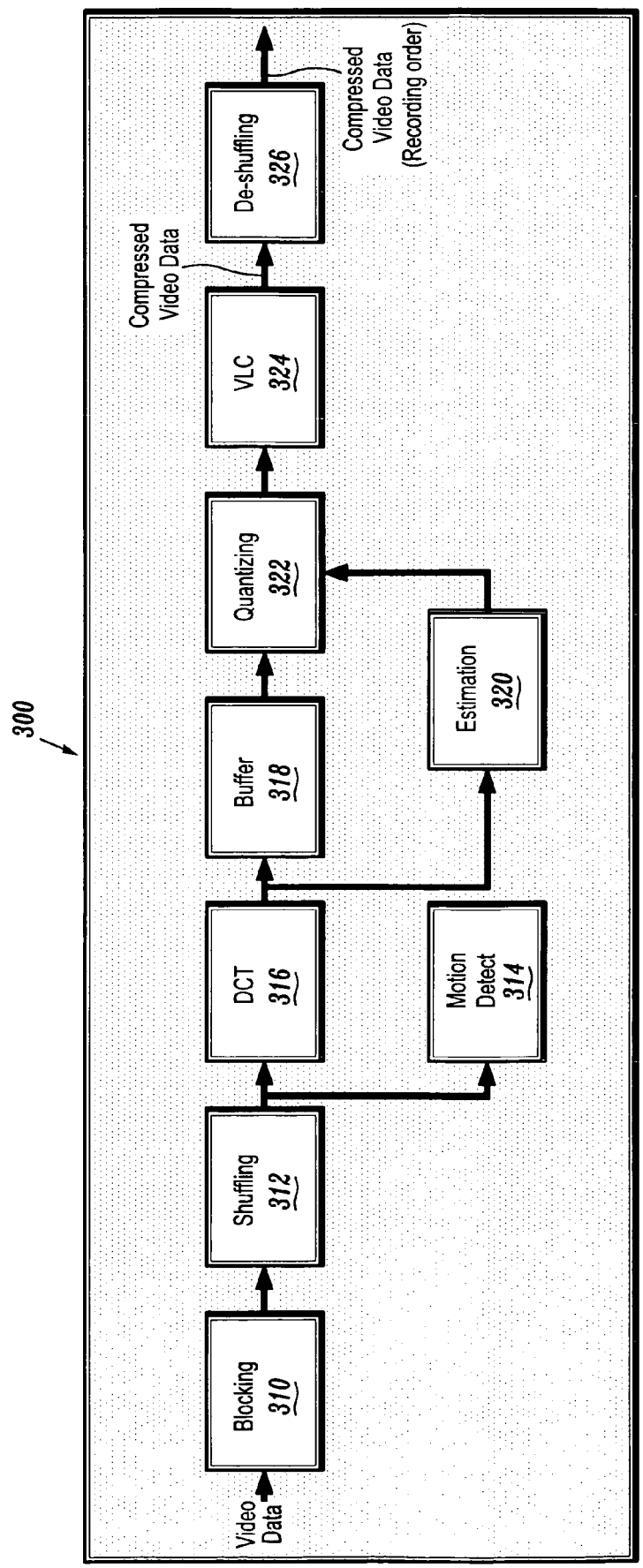
FIG. 3 shows a data-flow block diagram for a Digital Video ("DV") compliant encoder in accordance with FIG. 1.

Turning now to FIG. 3, a DV encoder is indicated generally by the reference numeral 300. The DV encoder 300 receives video data at a blocking unit 310, which passes data to a shuffling unit 312. The shuffling unit 312, in turn, passes data to each of a motion detection unit 314 and a Discrete Cosine Transform ("DCT") unit 316. The motion detection unit 314 also passes data to the DCT unit 316. The DCT unit 316 passes data to each of a buffer unit 318 and an estimation unit 320, each of which pass data to a quantizing unit 322. The quantizing unit 322 passes data to a Variable Length Coder ("VLC") 324, which outputs shuffled compressed video data to a de-shuffling unit 326. The de-shuffling unit 326 outputs compressed video data in recording order.

Figure 4:
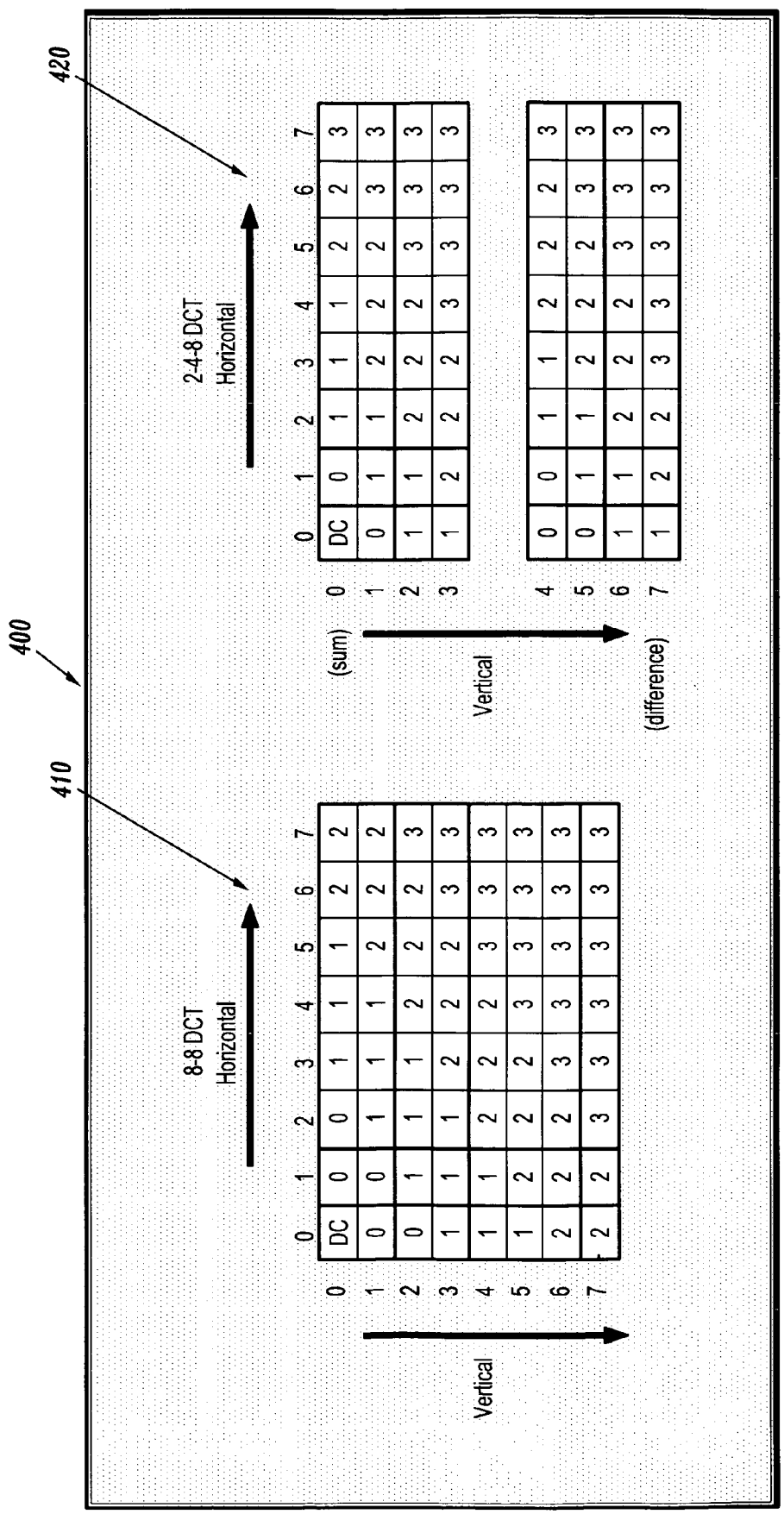
FIG. 4 shows tables of area numbers for 8-8 Discrete Cosine Transform ("DCT") and 2-4-8 DCT blocks in accordance with FIG. 3.

As shown in FIG. 4, area numbers for DCT blocks are indicated generally by the reference numeral 400. More specifically, area numbers for an 8-8 DCT are indicated in the matrix 410, and area numbers for a 2-4-8 DCT are indicated in the matrices 420.

Turning to FIG. 5, a quantization step matrix is indicated generally by the reference numeral 500. The matrix 500 includes the Quantization Numbers ("QNO") along the vertical. The matrix 500 includes the Class and Area numbers along the horizontal.

Figure 6:
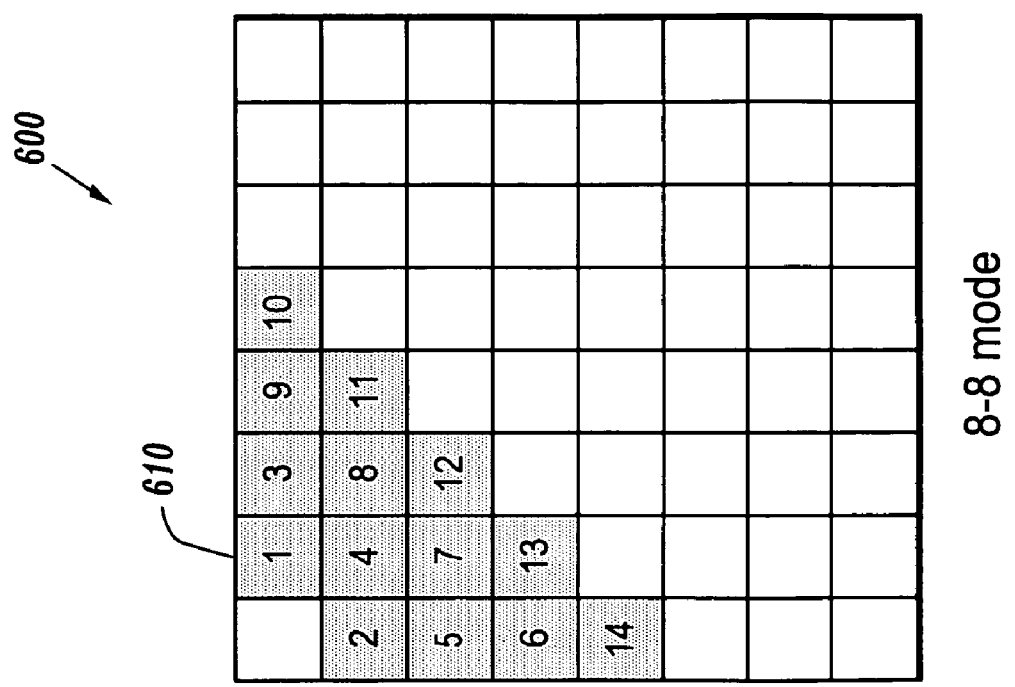
FIG. 6 shows a table of DCT coefficients selected for embedding in accordance with an 8-8 mode of FIG. 1.

Turning now to FIG. 6, DCT coefficients selected for embedding are indicated generally by the reference numeral 600. The actual coefficients selected for embedding in an 8-8 mode are indicated by the reference numeral 610.

Figure 7:
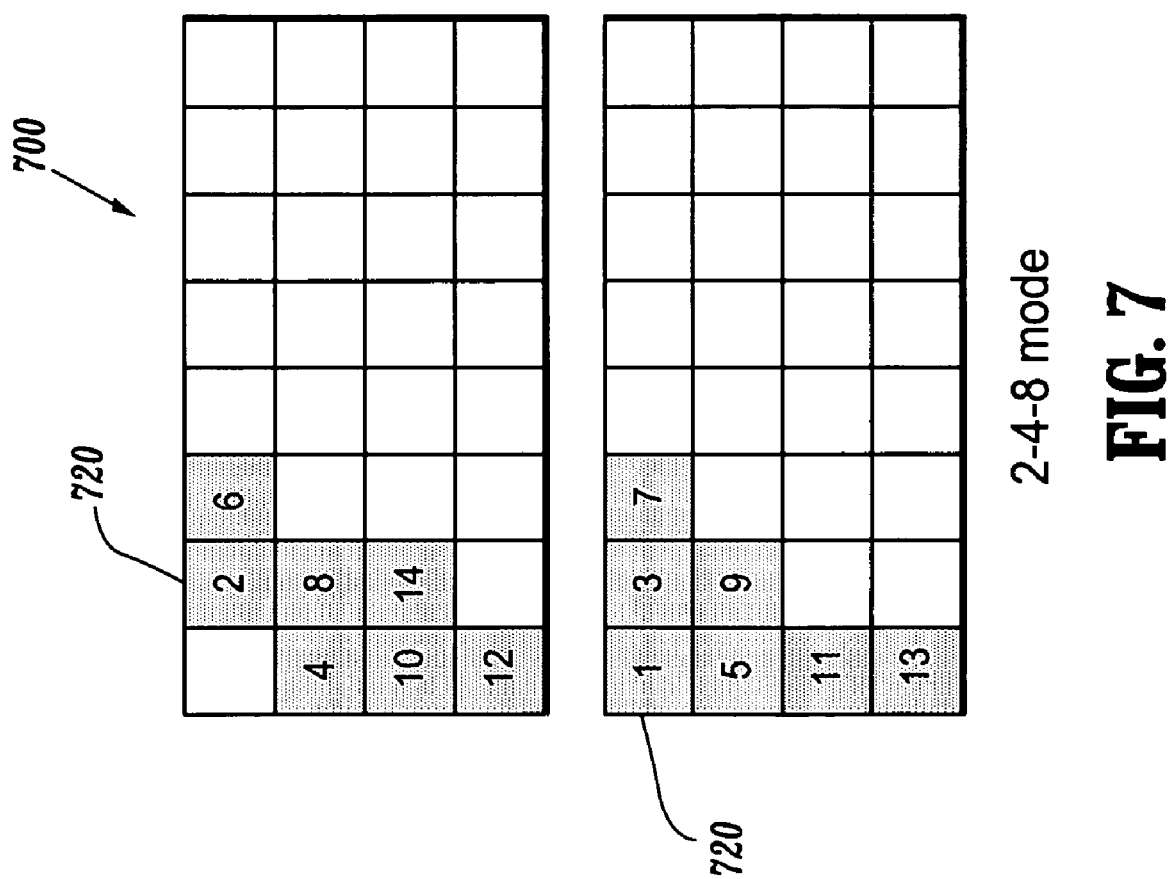
FIG. 7 shows a table of DCT coefficients selected for embedding in accordance with a 2-4-8 mode of FIG. 1.

As shown in FIG. 7, DCT coefficients selected for embedding are indicated generally by the reference numeral 700. The actual coefficients selected for embedding in a 2-4-8 mode are indicated by the reference numeral 720.

Figure 8:
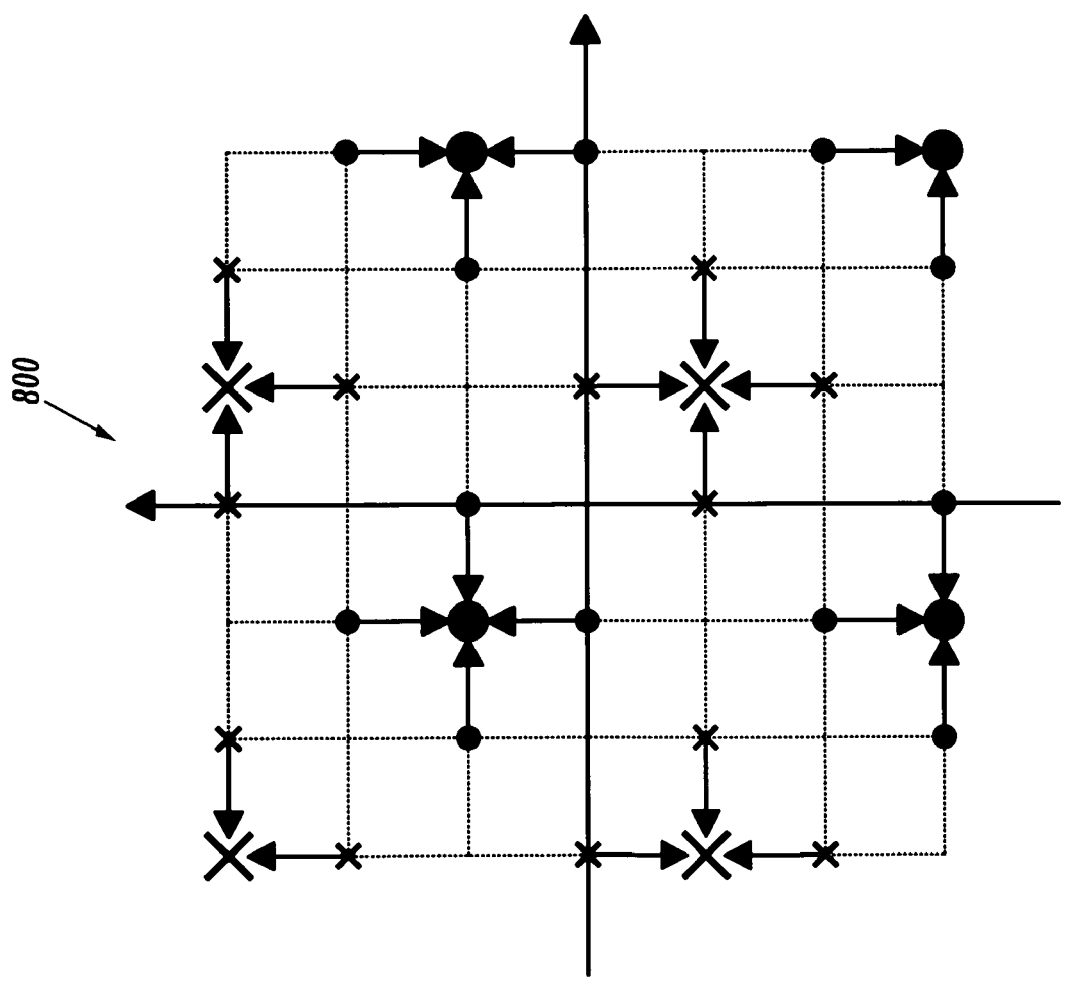
FIG. 8 shows a plot of two-dimensional ("2D") dithered quantization index modulation bits 0 and 1 in accordance with FIG. 1.

Turning to FIG. 8, a plot of two-dimensional dithered quantization index modulation is indicated generally by the reference numeral 800. Here, the 0 and 1 bits are indicated with crosses "X" and dots "●", respectively.

Figure 9:
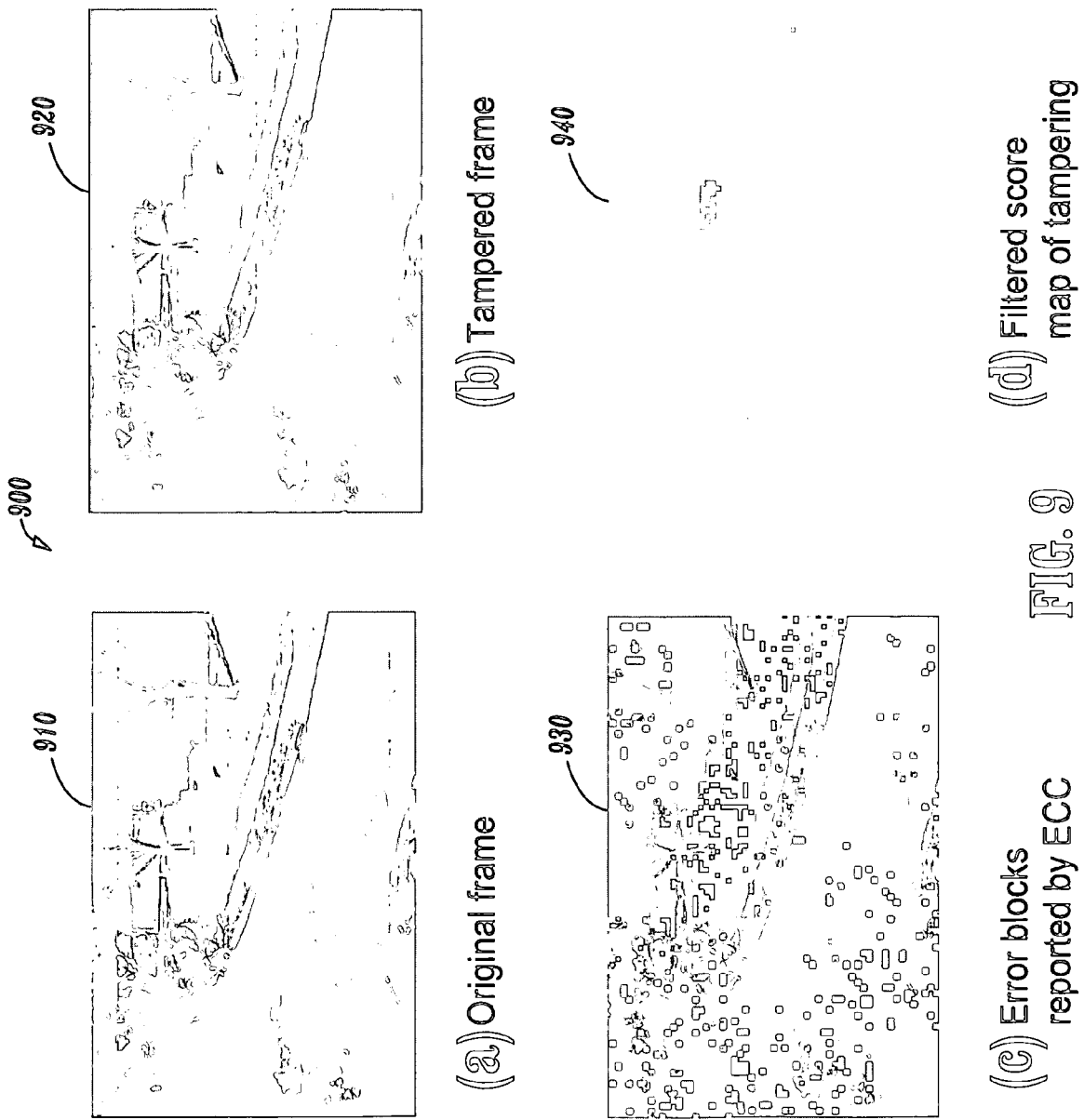
FIG. 9 shows a sequence of images representative of an exemplary localized tampering detection operation in accordance with FIG. 1.

Turning now to FIG. 9, an example of localized tampering detection is indicated generally by the reference numeral 900. Here, the first frame 910 is an original image frame, the second frame 920 is a tampered frame, the third frame 930 reflects error blocks reported by ECC, and the fourth frame 940 represents a filtered score map of tampering.

Figure 10:
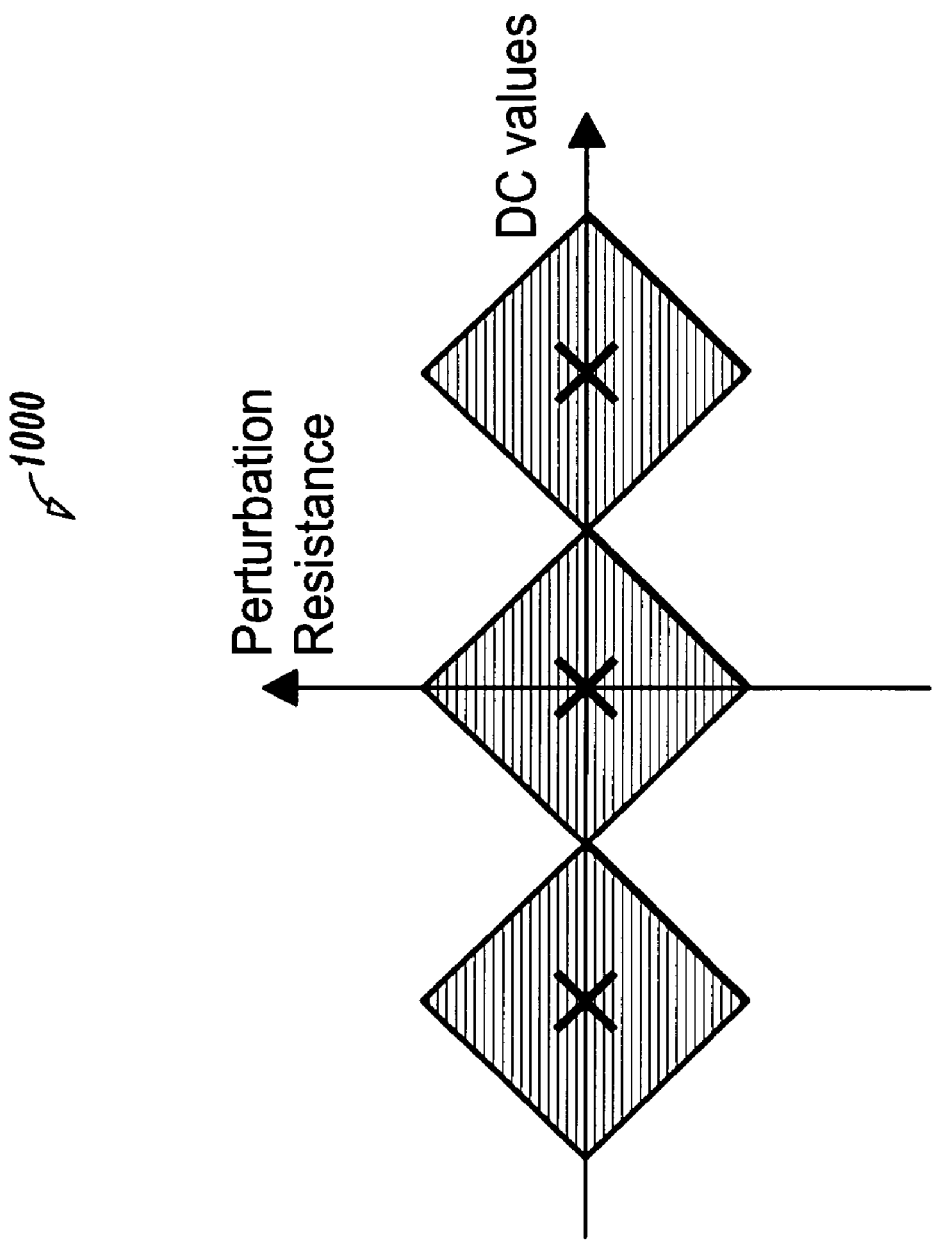
FIG. 10 shows a plot of variable perturbation resistance of DC values after coarse quantization in accordance with FIG. 1.

As shown in FIG. 10, an illustration of variable perturbation resistance of DC values after coarse quantization is indicated generally by the reference numeral 1000. Here, perturbation resistance is plotted on the vertical axis and DC values are plotted on the horizontal axis.

Figure 11:
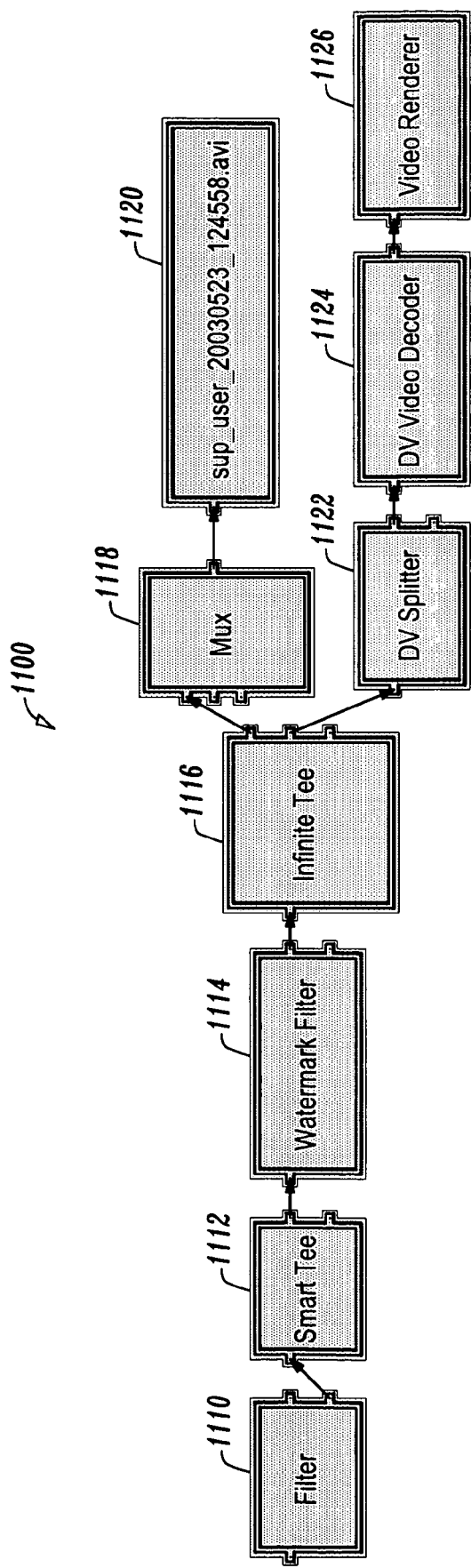
FIG. 11 shows a schematic diagram of a filter graph for authenticated acquisition in accordance with FIG. 1.

Turning to FIG. 11, a filter for authenticated acquisition is indicated generally by the reference numeral 1100. The filter 1100 includes a filter unit 1110 that passes signal data to a smart tree unit 1112. The smart tree unit 1112 passes signal data to a watermark filter unit 1114, which, in turn, passes signal data to an infinite tree unit 1116. The infinite tree unit 1116 passes signal data to a multiplexer unit 1118, which, in turn, passes signal data to a file storage unit 1120. The infinite tree unit 1116 also passes signal data to a DV splitter unit 1122. The DV splitter unit 1122 passes signal data to a DV video decoder unit 1124, which, in turn, passes signal data to a video renderer 1126.

Figure 12:
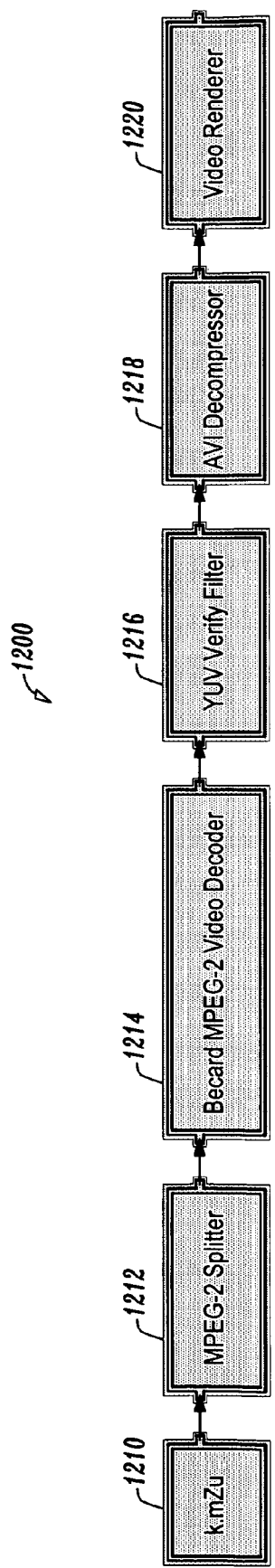
FIG. 12 shows a schematic diagram of a filter graph for an exemplary video player with watermark verification in accordance with FIG. 1.

Turning now to FIG. 12, a filter for a video player with watermark verification is indicated generally by the reference numeral 1200. The filter 1200 includes a video file reading unit 1210 that reads signal data from a storage device such as hard drives to an MPEG-2 splitting unit 1212. The MPEG-2 splitting unit 1212, in turn, extracts MPEG stream data and passes it to an MPEG-2 video decoding unit 1214. The MPEG-2 video decoding unit 1214 decodes the MPEG stream into a YUV signal and passes the decoded signal data to a YUV verification filter unit 1216, which, in turn, passes signal data to an AVI decompression unit 1218. The AVI decompression unit 1218 passes signal data to a video rendering unit 1220.

Figure 13:
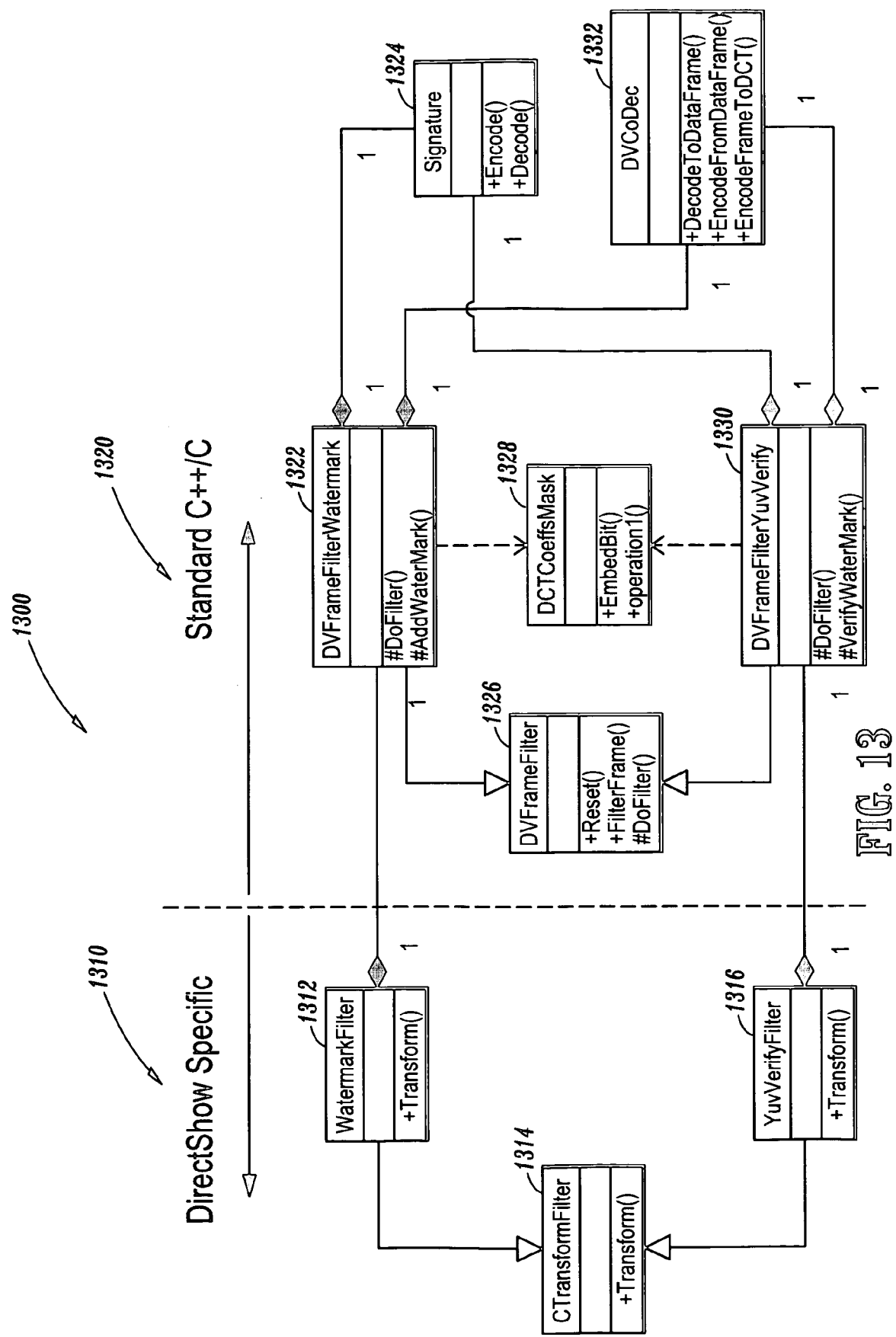
FIG. 13 shows a flowchart for watermarking and verification in accordance with FIGS. 1 and 2.

As shown in FIG. 13, a high-level design organization of the exemplary embodiment software, in the form of Unified Modeling Language ("UML") diagram, is indicated generally by the reference numeral 1300. Here, a first portion of the software 1310 is implemented with library commands specific to Microsoft's DirectShow® Software Development Kits ("SDK"), while a second portion of the software is implemented directly in the standard C and/or C++ programming language. The custom-built DirectShow® filter, WatermarkFilter, delegates all non-DirectShow® related watermarking tasks to the contained single instance of the implementer class DVFrameFilterWatermark, where containment is indicated by a diamond symbol. Similarly, the DirectShow® filter, YuvVerifyFilter, delegates all non-DirectShow® related watermark verification tasks to the contained instance of the implementer class DVFrameFilterYuvVerify. Both DVFrameFilterWatermark and DVFrameFilterYuvVerify classes are derived from a common base class, DVFrameFilter, which is indicated by a triangle, and which defines a common interface and implements common functions, the implementation of which relies heavily on three auxiliary classes: Signature, DVCodec and DCTCoeffsMask.

In operation of the exemplary system 100 of FIG. 1, a live scene is captured using the camera 112 from inside a car, and watermarked in real-time using an onboard laptop computer 114. For a tampering test, any video editing software may be used to modify the watermarked video in such a way that alteration is hardly detectable when viewed using a commercial video player. The watermark-verifying player 138 is then used to pinpoint the alteration.

Accordingly, the exemplary embodiment system 100 is comprised of three subsystems: the authenticated MVR acquisition subsystem 110, the video transfer subsystem 120, and the computerized MVR management subsystem 130. The authenticated acquisition subsystem 110 watermarks MVR video on-the-fly and may compress it off-line into MPEG format. Alternately, the computerized MVR management subsystem 130 may choose to compress it into MPEG format at a later time after the video transfer. Once the patrol car reaches the station, the video transfer system 120, downloads video data to the station server for archival, via a secure broadband wireless link, for example. The MVR management subsystem 130 may use a transactional database to provide services for video access, query, reproduction, storage and backup of MVR video, and to track each service request.

Thus, the system for authentication 100 of FIG. 1 includes the watermarking system 200 and the verification system 250, each of FIG. 2. The system 100 further includes components for key management, invariant extraction, and DV encoder variability resolution.

The systems of FIGS. 1 and 2 show the general framework of the MVR authentication system and depict its basic workflow. During the watermarking operation in the watermarking system 200, the input DV video is partially decoded to the level that the collection of Discrete Cosine Transform ("DCT") coefficient blocks is accessible. Invariant features are extracted from DCT blocks and key information for retrieval is stored in a control signature. The control signature and a user defined identity signature are encrypted and embedded in the DCT blocks. Error-Correcting Code ("ECC") is applied to all signature bits prior to embedding.

The order in which the DCT blocks are selected for embedding the identify bits is determined by the control signature, which contains key information to extract features invariant to MPEG compression. It shall be understood that this pseudo-random embedding order is content-dependent to prevent successful counterfeit attacks. After signature bit embedding, the DCT blocks are encoded back to DV stream data and written to disk. Watermarked DV video may be compressed offline to MPEG-2 format, such as standard DVD-quality with about 6 Mbps, using a commercial MPEG encoder.

During the verification operation of the system 250, MPEG stream data is partially transcoded to DV DCT blocks. The control signature is extracted to compute invariant features, so that the identity bits can be extracted from the same location and in the same order as they were embedded. Extracted signature bits are then decoded and decrypted to verify the integrity of the video content. The use of a public key encryption scheme ensures that the embedded signature bits cannot be re-embedded into another clip without being detected.

Referring back to FIG. 3, DV is a popular video format used by digital camcorders in the market. Given increasing availability of IEEE 1394 ports, also known as FireWire and i-Link ports, for real-time loss-less transfer of DV signal, DV is quickly becoming the de facto standard format for acquisition video. Knowledge of DV format is important for the understanding of issues regarding DV watermarking and its tolerance to MPEG compression.

DV employs intra-frame coding, as depicted in FIG. 3, which adopts Discrete Cosine Transform ("DCT"), adaptive quantization and Variable Length Coding ("VLC") to achieve a constant compression factor of about 5:1, resulting in a constant transfer rate of about 25 Mb/s. Key steps in DV encoding are described as follows.

Sampling: For the NTSC system used in the U.S., the luminance signal (Y) is sampled at 13.5 MHz producing 480 lines of 720 pixels each, and each color difference signal (CB/CR) is sampled at 3.375 MHz and 180 pixels per line (i.e., 4:1:1 YCbCr color space).

Blocking process: The picture area of the video data is divided into 8×8 pixel blocks. A macro block is formed of four horizontally adjacent luminance blocks and two chrominance blocks. A macro block is the smallest unit to package one each of the 8×8 chrominance blocks with their associated luminance blocks. 27 neighboring macro blocks form a super block, which is used as a basis for averaging picture details in the screen to achieve efficient compression.

Shuffling: The compression process is applied over five macro blocks gathered from five different super blocks. These five macro blocks form a video segment, which is the basic unit for archiving a constant transfer rate. In other words, each video segment is encoded independently with a fixed budget of 77×5=385 bytes.

DCT process: Each 8×8 pixel block is transformed from the spatial domain to the frequency domain. Referring back to FIGS. 4 and 5, Two DCT modes are employed to cope with picture motion. The standard 8-8 DCT mode is selected when there is little motion and the difference between the odd and even fields is small; while the 2-4-8 mode is selected when there is motion and the difference between the two fields is significant. The 2-4-8 mode performs two 4×8 DCTs, one for the sum between even and odd lines and one for the difference. Methods for choosing a DCT mode are proprietary and not specified by the DV standard.

Quantization process: Each AC coefficient is divided by a certain number in order to limit the amount of data in a video segment. The number that each AC coefficient is divided by is determined by its area number, as shown in FIG. 4 with respect to the simplified block diagram for the DV encoder of FIG. 3, and the assigned class number and quantization number ("QNO") are shown in FIG. 5. For example, the quantization vector for a block with class number of 2 and QNO of 10 is [1,1,2,2] for coefficients of area 0 to 3, meaning that coefficients in areas 0 and 1 are left unchanged while coefficients in areas 2 and 3 are right-shifted by one bit, which is equivalent to being divided by 2. Note that only bit shifting rather than actual division is involved in quantization for efficiency purposes. The class number is decided by estimating the activity in each DCT block and the QNO is determined under the constraint that the resulting bit rate after VLC does not exceed the allowed bit budget of the video segment. Methods for choosing the class number and QNO are not specified by the standard and are often proprietary. The DC coefficient is not quantized.

VLC: The VLC transforms fixed length quantized AC coefficients to variable length code words. While the VLC plays a crucial role in bit rate compression, this loss-less process does not substantially affect the watermarking algorithm design.

The DV Watermarking Algorithm is central to the presently disclosed MVR authentication algorithm. Described herein are the details of its design and implementation, which involve decisions regarding where, how and what signature bits to embed in the host signal. To this end, MPEG compression and a Binary Symmetric Channel ("BSC") model are also discussed.

Understanding how MPEG compression works is critical for the watermarking algorithm design. The following is a set of relevant information about MPEG that is utilized by the exemplary algorithm.

Color space: MPEG-2 uses the same YCbCr color space as DV, albeit with 4:2:0 sampling. Because of the sampling difference in the chrominance domains between MPEG and DV, only DCT blocks from the luminance domain Y are used for watermark signature bit embedding. Color space conversion can have detrimental effects on watermark recovery.

Group of pictures ("GOP"): MPEG compresses video frames in units of GOPs. A GOP includes one I-frame, with several P-frames and/or B-frames in between. The default GOP structure for DVD encoding is used herein, which is IBBPBBPBBPBBPBB. I-frames use intra-frame encoding and do not depend on any other frame. P-frames encode residue of motion compensated forward prediction from the previous P- or I-frame, and B-frames encode residue of motion compensated bi-directional interpolation between the previous P- or I-frame and the next P-frame.

I-frames in MPEG are most similar to DV frames. They essentially requantize the DCT coefficients in DV using different quantization scales. Requantization can be adequately described by a binary symmetric channel ("BSC"), which has been extensively studied in communication theory. Non-Intra frames are more difficult to model, but the BSC model still provides a reasonable approximation for high-quality MPEG encoding according to the present Applicants' experimental findings.

For watermark verification purposes, the effect of MPEG compression is effectively modeled by a BSC with high bit-error rate. Depending on the MPEG frame type and desired robustness for signature bits, a range of bit-error rate between 10% and 25% is observed from these experimental results. Control signature bits are tuned in the exemplary algorithm to have slightly lower error rates than identity bits.

The watermark verification process makes a minimum assumption about MPEG-2 encoding, which makes it easy to adapt newer compression standards such as MPEG-4 in alternate embodiments. The choice of MPEG-2 over other formats is business and application driven, as MPEG-2 is currently the most popular and widely available format for storage and distribution and can be viewed in a variety of video players including DVD and PC.

Next, the watermark-embedding domain is discussed. The decision on where to embed is relatively easy. In a nutshell, DV data consist of a stream of quantized and encoded DCT coefficients of 8×8 pixel blocks from video frames traversed in a predetermined order. There exist compelling reasons to choose DCT domain for watermarking embedding, which are summarized as follows.

Efficiency: Transformations of DV stream to spatial domain for watermarking and then back to DCT are computationally demanding.

High embedding rate and robustness: Distributions of DCT coefficients tend to be much more predictable than pixel values. Good masking characteristics, particularly in low-frequency DCT coefficients, can be exploited to achieve high bit rate and robustness.

Effective modeling of MPEG compression: Transcoding DV to MPEG-2 and back to DV can be effectively modeled as transmitting the DV DCT coefficients through a binary symmetric channel ("BSC").

In the exemplary implementation, the first fourteen quantized AC coefficients are used in a zigzag ordering for embedding, as shown in FIGS. 6 and 7. There is a high-energy concentration among these coefficients and degradation introduced by watermarking is not visually perceivable. It is found that coefficients corresponding to higher frequencies are not suitable for embedding. Due to their smaller amplitude and greater quantization scale, there is a much greater likelihood that they will be zero after quantization. Run-length patterns of zero coefficients are heavily exploited by the DV encoding standard to maintain video quality. Hence, significant modification can lead to excessive degradation in details because high frequency coefficients may be forced to zero to maintain DV's constant transfer rate.

The bit embedding method is described next, including how the encoded watermark bits are embedded in 8×8 DCT blocks of the host video. The design for the embedding method achieves efficient trade-offs among three conflicting goals: (1) maximizing the embedding bit rate; (2) minimizing distortion between the host video and the marked video; and (3) controlled robustness of the embedding. For the application of MVR authentication, the ability of tuning robustness is particularly desirable.

Existing embedding schemes can be classified as either host-interference rejecting or host-interference non-rejecting. In host-interference non-rejecting methods, the host signal acts as additive interference or noise. Spread spectrum methods are classic examples of the host-interference non-rejecting type. It has been shown in that host-interference non-rejecting methods have limited achievable rate-robustness performance at a fixed level of embedding-induced distortion.

By exploiting knowledge of the host signal, host-interference rejecting methods can achieve superior robustness at comparable embedding bit-rates and allow easy trade-offs among rate, distortion and robustness. Generalized low-bit modulation and quantization index modulation ("QIM") methods have demonstrated their high embedding capacity and robustness. It has been demonstrated that information embedded in video at a rate of 2 or more bits per 8×8 DCT block can survive MPEG compression.

One desirable property of host-interference rejecting methods is the ability to tune the robustness of embedded bits. This can be achieved by using the generalized low-bit modulation ("GLBM") method, for example. Let $\underline{x}$ denote the vector of DCT coefficients from an 8×8 block, and $\underline{v}$ denote a pseudo-random vector. A first step for embedding is to project $\underline{x}$ onto $\underline{v}$:

$$\text{Let } \tilde{x} = \underline{x}^T \underline{x} \qquad (\text{Eqn. 1})$$

The information bit b is embedded in the projection of $\tilde{x}$ by quantizing it with a uniform scalar quantizer $q_\Delta$ of step size $\Delta$ and perturbing the reconstruction point by an amount $d(b)$ that is determined by b. The carrier vector, $\underline{s}$, after embedding b is:

$$\underline{s} = \underline{x} + (q_\Delta(\tilde{x}) + d(b) - \tilde{x}) \underline{v} \qquad (\text{Eqn. 2})$$

The robustness of the embedded bit b can be controlled by the selection of projection vector $\underline{v}$, quantization step $\Delta$ and perturbation $d(b)$.

After exploring several variants of host-interference rejecting methods, the dithered QIM method was selected to implement bit embedding for its simplicity and efficiency. If it is desired to embed a bit b in the host vector $\underline{x}$, where $\underline{x}$ is formed from a subset of the 14 AC coefficients in a DCT block as shown in FIGS. 6 and 7, a pair of dither vectors of length 14, $\underline{d}(0)$ and $\underline{d}(1)$, is used to modulate the host vector $\underline{x}$. Given a uniform quantizer $q_\Delta$ with a step size $\Delta$, the k-th element of dither vector $\underline{d}(b)$, $d_k(b)$, is defined as:

$$d_k(b) = (-1)^{k+b} \Delta/4, \ b=0,1 \qquad (\text{Eqn. 3})$$

The modulated carrier vector, $\underline{s}$, is computed as a Cartesian product of the scalar QIM.

$$s_k = q_\Delta(x_k + d_k(b)) - d_k(b) \qquad (\text{Eqn. 4})$$

The nearest distance rule is used for hard-decision bit decoding. How the dithered QIM work can be best explained by example. FIG. 8 illustrates a 2D dithered QIM for $\Delta=4$. The possible values for the modulated carrier vector $\underline{s}$ for bits 0 and 1 are marked with large cross x and dot ●, respectively. The carrier vector $\underline{s}$ is perturbed by a BSC to produce a perturbed carried vector $\underline{\tilde{s}}$, which could be at any vertex in FIG. 8. $\underline{\tilde{s}}$ is decoded to the bit of the nearest modulated vector $\underline{s}$.

As shown in FIG. 8, all vectors marked with small cross "x" will be decoded to 0, and vectors marked with small dot "●" decoded to 1. Note that QIM is capable of correcting small perturbations. Hard-decision decoding would have to arbitrarily assign the unmarked vertices, which have the same minimum distance to 0-modulated vectors and 1-modulated vectors, to 0 or 1.

Randomized assignment is often used to avoid bias. Even though the percentage of equal-distance points becomes smaller as the dimension increases, avoiding hard-decision is still much preferred. In the presently disclosed exemplary implementation, QIM does not make hard-decoding. It instead outputs the distances from $\underline{\tilde{s}}$ to the nearest 0-modulated vector and 1-modulated vector to the downstream ECC decoder.

Error-correcting watermark signature encoding and decoding are now described. Watermark signature refers to user data stored in host video. An MVR watermark contains two signatures: identity and control. The identity signature is used to uniquely identify the event recorded in a video. It is user defined, which might include the patrol car ID, officer's badge number and a time stamp, for examples. The MVR administrators will determine its exact content for their agencies so that the contained information can be used for automated indexing and search. Identity signature is encrypted using a secret key before being encoded and embedded. The control signature contains data of interest only to the watermarking software to facilitate detection of tampering and counterfeit. In the exemplary implementation, the control signature encodes content-dependent information used for invariant extraction. Details of invariant extraction are deferred to subsection 0.

Regardless of the signature type, user data is converted into a redundantly encoded bit stream using error-correcting coding ("ECC") before embedding. The bit-error rate introduced by MPEG compression is much too large for QIM to correct by itself. There is little hope of recovering watermark signature without ECC, for example. ECC not only provides an effective means for reliable recovery of watermark signatures, but also provides valuable clues for tamper detection.

Most sophisticated ECC schemes were designed originally for telecommunications, where the transmission channel is characterized by a low sustained bit-error rate with possible high burst error rate. Operating outside their optimal environment, these telecommunications ECCs could be outperformed by the simple repetition code, for example. For instance, error probability for BCH code is orders of magnitude better than repetition code with similar redundancy ratio when the BSC's bit-error rate is much below 10%. However, the repetition code can have significantly lower error probability, i.e. better error-correction capability, than BCH code when the bit-error rate reaches above 15%. It is not unusual to have a bit-error rate above 20% when an embedded watermark needs to be recovered from MPEG compressed video.

Accordingly, three types of ECC were evaluated for the very high bit-error rate environment of watermark decoding: binary BCH code, repetition code, and a cascading of the two. Test results are consistent with findings reported in the art, including that the BCH code is not effective for error correction; the repetition code has good error correcting capability but cannot detect error occurrences; and the cascading BCH and repetition code yields the best error correcting capability with excellent error detection capability.

In cascading code, user data is encoded first using a BCH code and the resulting bits are then repeated before embedding. During decoding, the repetition code reduces the BSC's bit-error rate to a more favorable level for BCH code to be effective. In addition to having a lowest error probability in absence of tampering, this cascading code has two other very attractive properties. The first is excellent error-detection capability inherent in BCH code, which includes detecting uncorrectable errors, which provides invaluable clues of tampering. The second is soft-decision input from QIM, whereby the repetition code can be easily adapted to work with distances provided by QIM to improve the overall error-correcting capability.

Two bits are embedded in each DCT block, one as part of the identity signature and the other as part of the control signature. Note that the identity signature is not a function of video frame and can be repeated throughout the duration of the event. Because the control signature is frame dependent, it is tuned to be more robust than the identity signature.

Watermark extraction and tamper detection are discussed next. There are three types of video that the watermark extraction module has to deal with: watermarked without tampering, watermarked with tampering, and not watermarked. Two basic outcomes are possible: the video is authenticated with valid watermark detected, or it is not. Table 1 shows the expected outcome for each scenario.

TABLE 1

Scenarios for watermark extraction and expected outcomes

| Scenario | Expected Outcome |
|---|---|
| Watermarked without tampering | Video authenticated |
| Watermarked with tampering | Video not authenticated |
| Not watermarked | Video not authenticated |

A first step to watermark extraction is to decode the bit stream output by dithered QIM, regardless of the watermark signature type. After the first pass of bit consolidation by repetition code, user data is recovered at the BCH output. The probability for uncorrectable errors is substantially insignificant for BSC with bit-error rates well above the MPEG induced error rate. As a result, it is safe to conclude that watermark signatures can be reliably extracted in the absence of tampering.

When there are more error bits than what the BCH code is capable of correcting, it is probable that the BCH decoder will report a failure-to-decode for a detected error, rather than outputting an erroneous but valid codeword for an undetected error. In other words, BCH code has a very high probability of error detection.

The rate of undetected errors is orders of magnitude smaller than the rate of uncorrected errors. For videos with severely damaged watermark by tampering or without watermark at all, the BCH code will simply report failure-to-decode and will not extract any user data. In this case, the decision that the videos are not authenticated is straightforward. Experience indicates that the BCH decoder is very capable of detecting tampering in most altered video that we have produced. In fact, it is exceedingly difficult and time consuming to produce a tampered video with errors that are correctable by BCH but at the same time visually unperceivable.

The most challenging scenario is when tampering is mild enough that resulting bit errors are still within BCH's error correcting capability. In this case, BCH does not report a decoding error, and hence, content-preserving compression must be distinguished from subtle content-altering tampering, such as small object overlaying and localized scene modification, for examples. A statistical hypothesis testing approach, as implemented in the exemplary embodiment, is described herein. When BCH successfully decodes a codeword, the decoder also knows of the exact positions at which errors have occurred. By propagating errors backward to the repetition decoder, the block locations where error-bits have been detected can be identified. Under the null hypothesis that the video is not tampered with and that all the errors were caused by MPEG compression, the spatial and temporal distribution of these DCT blocks should be random. In contrast, localized tampering produces clusters of localized error blocks.

Goodness-of-fit testing for complete spatial randomness ("CSR") is a widely studied topic in statistics with applications in Geographic Information Systems ("GIS"), ecology, and disease control, among others. Under CSR, error blocks are independent, the number of error blocks in any area is Poisson distributed with parameter $\lambda$, and distribution of nearest-neighbor distance square sum is $\chi^2$ distributed with a constant scaling $2\pi\lambda$. Unfortunately goodness-of-fit tests for CSR do not work well in cases of interest, including those well known for their ability to detect departure from CSR on small scale such as the nearest-neighbor method.

DCT blocks are arranged in a regularly spaced rectangular lattice and the distribution of error blocks can be approximated accurately by continuous spatial distribution only when they account for a small percent of all blocks. In high error-rate cases, the likelihood of adjacent error blocks is too high for the nearest neighbor method to be effective. Furthermore, the error blocks are not identically distributed; as MPEG compression tolerates more errors in busy areas than in smooth areas because MPEG encoders exploit the fact that the human visual system is less perceptive to high-frequency degradations than to low-frequency degradations.

Domain specific knowledge is incorporated into tamper detection. It is found that exploring spatial and temporal dependencies provided effective means for discriminating between tampered and non-tampered regions. In tampered regions, the error block rate may be roughly 50%, and the likelihood of finding large clusters of connected error-blocks is much higher than in non-tampered regions. Two error blocks are considered connected if they are adjacent spatially or temporally, such as within a 26-neighborhood, for example. In development experiments for the present disclosure, all frames in a GOP (90×60×15 blocks) are used as a basis for tamper-detection. A likelihood value for possible tampering is assigned to each error block based on the number of neighbors it has. The likelihood is then integrated temporally to compute a score map showing any potentially tampered region.

FIG. 9 shows an example of such tamper detection. A watermarked MPEG video frame 910 is manipulated by replacing a telephone exchange box with snow in video frame 920. From a single frame error-block distribution 930, it is difficult to detect the subtle tampering. However, tampering becomes evident after likelihood filtering 940. Note that not every block is used for watermark embedding in this particular exemplary embodiment, although alternate embodiments may do so. Blocks in the five regions with slightly darker appearance correspond to five unmarked super blocks. In alternate embodiments, a continuously rotating scheme may be implemented to repeatedly embed identity signature bits so that every block will be used. In addition, such embodiments will prevent temporal jitter attack. Additional alternate embodiment tamper detection systems may use more and/or refined processing power to detect difficult fast moving overlaid objects, for example. For instance, spatial shape correlation between adjacent frames could provide additional discrimination power.

Although the watermarking algorithm is the foundation of the MVR authentication algorithm, optional supporting components described herein support complete solutions for specific application embodiments.

Encoder variation is discussed relative to one practical problem that was encountered, that is, the variation among different DV encoders. Recall that the exemplary embodiment embeds watermark bits in quantized DCT coefficients. During watermark verification, the MPEG video stream is partially encoded into DV format to gain access to these quantized DCT coefficients. To ensure reliable recovery of embedded bits, the DCT blocks need to be quantized in a consistent manner between embedding and verification.

Invariant extraction is now discussed. An important topic in watermarking is the order of blocks in which signature bits are embedded. It is important that the embedding order be a pseudo-random sequence that introduces dependency among blocks. The seed for generating this pseudo-random sequence should be data dependent and extracted from frames for security reasons. It is well known that independent block-wise watermarking is vulnerable to counterfeit attack. Invariant features are extracted to generate seeds for a pseudo-random sequence using a hash function.

Invariants refer to features that remain unchanged when a video is transcoded from DV to MPEG and back to DV. It is known that the DC coefficients are very stable features to transcoding. Due to high sensitivity of the human visual system to changes in DC coefficients, video compressors are designed to maintain their precision. DV format uses 9 bits to store each DC coefficient without quantization, and MPEG-2 uses at least 8 bits for DC coefficients. Experiments also confirm this assessment. However, the DC coefficients are not invariant. Even when an MPEG-2 encoder uses 9 bits to store DC coefficients, it is common for some DC values to differ slightly before and after MPEG encoding.

In spite of not being invariants, DC coefficients can be exploited to generate invariants if one applies a coarse quantizer to the DC coefficients with quantization levels marked by X as shown in FIG. 10, for example. Note that the perturbation needed to switch a DC coefficient to an adjacent quantization level depends on the value of the coefficient. As shown in FIG. 10, coefficients with values close to the quantization level can resist large perturbations while coefficients with values near midpoints between quantization levels are very susceptible to perturbation. Given a coarse enough quantizer, coefficients with values near a quantization level will be invariant to the quantizer with very high probability.

An invariant extraction algorithm works as follows. For all DCT blocks with a DC coefficient value close to a quantization level of a coarse quantizer, it randomly select a small number of blocks and encodes these block numbers as part of the control signature. One possible realization, for example, is to randomly select 16 blocks whose DC coefficients differ by 1 or less from multiples of 32. These 16 block numbers are embedded in fixed locations as part of the control signature in the watermark. During verification, these block numbers are extracted and the corresponding DC coefficients are then coarsely quantized to generate the seed for the random sequence of the embedding order.

Watermark encryption and key management are now discussed. The public-key paradigm may be used to encrypt the watermark signatures. A pair of private and public keys is generated. The private key is used for encryption and is kept secret. The corresponding public key is published and used for decryption during watermark verification. Open-source PGP software by Network Associates, for example, may be used for implementation.

Public key tracking and safeguarding of private keys are among the issues concerning key management. The end-users of the watermarking computers used for video watermarking may not be considered trusted entities for cryptography purposes, and therefore must be prevented from accessing the private keys. A solution is to rely on the security feature of Microsoft's Windows® Operating System for securing the private key. A trusted entity with administrator privilege creates and stores the private key without granting access to end-users. The authenticated acquisition software is run as an Operating System ("OS") service with read-only access to this private key. The end-user interacts only with the software through a predefined graphical user interface ("GUI") without direct access to the private key. Alternate embodiments may implement a temporal key renewal scheme that installs a new private key every time the patrol car has parked near the station, for example, and has completed the video transfer.

As more and more events are accumulated and key pairs are created, automated key tracking becomes indispensable. A small database will be used to store relationships between events and the associated public keys to decode the watermarks embedded in them.

Thus, in an exemplary embodiment, a fully functional digital MVR authentication system has been developed for live MVR video capture and on-the-fly authentication. Referring back to FIG. 13, a software architecture embodiment utilizes the framework of Microsoft DirectShow®, which is a part of DirectX® SDK. Microsoft DirectShow® is an architecture and a set of low-level application programming interfaces ("APIs") for high-quality capture and playback of multimedia streams on the Microsoft Windows® platform. DirectShow® also provides access to the underlying stream control architecture for applications that require custom solutions.

To handle the variety of sources, formats, and hardware devices that are possible, DirectShow® uses a modular architecture, in which the application creates one or more software components called filters, and connects them together so that the data from one filter travels to the next. A set of filters that work together is called a filter graph. For example, FIG. 11 shows a filter graph for authenticated video acquisition from a DV camcorder. Microsoft® Windows® Driver Model ("WDM") driver for DV camcorders ("MSDV") filter source sends a DV stream to the watermark filter and the watermarked stream is stored in a file named sup_user_20030523_124558.avi. A secondary stream is branched from the Infinite Tee filter for preview. Note that Watermark 1114 is a custom-built DirectShow filter encapsulating the presently disclosed watermarking algorithm. Similarly, a watermark verification algorithm is also encapsulated in a DirectShow® filter, namely the YUV Verify Filter 1216 of FIG. 12. The YUV Verify filter 1216 is used to build an MPEG player with built-in watermark verification capability. If tampering is detected, the output to the video renderer is scrambled to provide visual feedback to alert a viewer to the failed authentication.

The exemplary embodiment software includes the Watermark and YUV Verify filter components and a GUI application that dynamically builds, modifies and executes graph filters to accomplish tasks of authenticated video acquisition and watermark verification.

Exemplary embodiment design and implementation is shown in FIG. 13 as the high-level design of Watermark and YUV Verify filters and their underlying implementation. Both WatermarkFilter and YuvVerifyFilter classes are derived from DirectShow®'s CTransformFilter, and implement the necessary wrapper for subclasses of DVFrameFilter to become DirectShow®-compliant filters. The virtual function Transform( ) passes video data via Reset( ) to the DVFrameFilter object and triggers a FilterFrame( ) call to initiate filtering. The implementation of DVFrameFilterWatermark and DVFrameFilterYuvVerify relies heavily on three auxiliary classes: the Signature class is in charge of converting user data into a bit stream for embedding and back; the DVCoDec class encapsulates partial decoding/encoding of DV stream and invariant extraction; and the DCTCoeffsMask class performs QIM bit embedding and extraction. Encryption and ECC encoding of user data is encapsulated in the Signature class.

Note that there is a clear decoupling between DirectShow® wrapper classes and their implementation. Applications such as a batch watermark verifier, where DirectShow® is not needed, can be easily implemented using the subclasses of DVFrameFilter.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A hybrid digital watermarking system for video authentication, the system comprising:
   an authenticated acquisition subsystem for digital watermarking video data;
   a video management subsystem in signal communication with the authenticated acquisition subsystem for verifying the digital watermarked video data; and
   signature means for applying a control signature to the video data,
   wherein the signature means embeds signature bits into data blocks in accordance with a pseudo-random sequence that introduces a dependency among the blocks,
   wherein the pseudo-random sequence is generated from a data-dependent seed extracted from at least one frame,
   wherein the data-dependent seed is responsive to at least one DC coefficient, and
   wherein the at least one DC coefficient is coarsely quantized prior to seed generation.

2. A system as defined in claim 1 wherein the video management subsystem is in intermittent signal communication with the authenticated acquisition subsystem.

3. A system as defined in claim 1, the authenticated acquisition subsystem comprising a video imaging device for acquiring original video data.

4. A system as defined in claim 1, the authenticated acquisition subsystem comprising a watermarking device for applying each of an identity signature and a control signature to the video data.

5. A system as defined in claim 4 wherein the control signature comprises fragile control bits and robust control bits.

6. A system as defined in claim 4 wherein the identity signature and the control signature are applied to the video data concurrent with real-time acquisition of the video data.

7. A system as defined in claim 4 wherein the identity signature and the control signature are embodied in a single hybrid digital watermark.

8. A system as defined in claim 7 wherein the single hybrid digital watermark achieves progressively varying robustness in a single watermark by means of at least one of error-correcting signature coding and rate-distortion guided bit embedding.

9. A system as defined in claim 1, the video management subsystem comprising a verification device for verifying a control signature and an identity signature.

10. A system as defined in claim 9 wherein the identity signature and the control signature are extracted from a single digital watermark.

11. A system as defined in claim 1, the video management subsystem comprising a watermark verifying playback device for verifying a control signature and an identity signature and displaying verified video data.

12. A system as defined in claim 11 wherein the watermark verifying playback device alerts a user to the presence of altered video content.

13. A hybrid digital watermarking system for video authentication as defined in claim 1, the system further comprising watermark means for digitally watermarking the video data.

14. A system as defined in claim 13, further comprising verification means in signal communication with the watermark means for verifying the digitally watermarked video data.

15. A system as defined in claim 14, further comprising transmission means for intermittently transmitting the digitally watermarked video data prior to verification.

16. A system as defined in claim 14, further comprising compression means for compressing the digitally watermarked video data prior to verification.

17. A system as defined in claim 16 wherein the compression means comprises encoding means for Moving Pictures Expert Group ("MPEG") encoding the digitally watermarked video data prior to verification.

18. A system as defined in claim 17 wherein the encoding means comprises MPEG-2 encoder means for encoding the digitally watermarked video data prior to verification.

19. A system as defined in claim 17 wherein the encoding means comprises MPEG-4 encoder means for encoding the digitally watermarked video data prior to verification.

20. A system as defined in claim 14, further comprising imaging means for acquiring original video data.

21. A system as defined in claim 20 wherein the imaging means acquires original video data in Digital Video ("DV") format.

22. A system as defined in claim 14, further comprising signature means for applying each of an identity signature and a control signature to the video data.

23. A system as defined in claim 22 wherein the signature means applies the identity signature and the control signature to the video data concurrent with real-time acquisition of the video data.

24. A system as defined in claim 22 wherein the signature means is in signal communication with the watermark means for combining the identity signature and the control signature in a single hybrid digital watermark.

25. A system as defined in claim 24, further comprising at least one of:
coding means for coding error-correcting signatures in the single hybrid digital watermark; and
embedding means in signal communication with the encoding means for embedding rate-distortion guided bits in the single hybrid digital watermark to achieve progressively varying robustness.

26. A system as defined in claim 24, further comprising verification means for verifying a control signature and an identity signature.

27. A system as defined in claim 26 wherein the verification means extracts the identity signature and the control signature from a single digital watermark.

28. A system as defined in claim 24, further comprising:
signature verification means for verifying at least one of a control signature and an identity signature; and
display means in signal communication with the signature verification means for displaying verified video data.

29. A system as defined in claim 28, further comprising alert means for producing an alert responsive to the presence of altered video content.

30. A system as defined in claim 16, the verification means comprising tamper detection means responsive to knowledge specific to the compression domain.

31. A system as defined in claim 30 wherein the compression domain comprises DCT encoded data.

32. A system as defined in claim 30 wherein the knowledge specific to the compression domain comprises at least one of spatial and temporal dependencies.

33. A system as defined in claim 30, further comprising:
likelihood means for assigning a likelihood value for possible tampering to each error block based its number of neighbors; and
temporal integration means for temporally integrating the likelihood values to compute a score map indicative of potentially tampered regions.

34. A system as defined in claim 22 wherein the signature means embeds signature bits into data blocks in accordance with a pseudo-random sequence that introduces a dependency among the blocks.

35. A system as defined in claim 34 wherein the pseudo-random sequence is generated from a data-dependent seed extracted from at least one frame.

36. A system as defined in claim 35 wherein the data-dependent seed for generating the pseudo-random sequence is itself generated using a hash function.

37. A system as defined in claim 36 wherein the data-dependent seed is responsive to at least one DC coefficient.

38. A system as defined in claim 37 wherein the at least one DC coefficient is coarsely quantized prior to seed generation.

39. A method of hybrid digital watermarking for video authentication, the method comprising:
digitally watermarking video data;
verifying the digitally watermarked video data;
applying a control signature to the video data;
embedding bits of the control signature into data blocks in accordance with a pseudo-random sequence that introduces a dependency among the blocks;
extracting a data-dependent seed from at least one frame, wherein the seed is responsive to at least one DC coefficient;

generating the pseudo-random sequence from the extracted data-dependent seed; and applying a coarse quantizer to the at least one DC coefficient prior to seed generation.

40. A method as defined in claim 39, further comprising intermittently transmitting the digitally watermarked video data prior to verification.

41. A method as defined in claim 39, further comprising compressing the digitally watermarked video data prior to verification.

42. A method as defined in claim 41 wherein compressing comprises Moving Pictures Expert Group ("MPEG") encoding the digitally watermarked video data prior to verification.

43. A method as defined in claim 42 wherein compressing comprises MPEG-2 encoding the digitally watermarked video data prior to verification.

44. A method as defined in claim 42 wherein compressing comprises MPEG-4 encoding the digitally watermarked video data prior to verification.

45. A method as defined in claim 39, further comprising acquiring original video data.

46. A method as defined in claim 45 wherein the acquired original video data is in Digital Video ("DV") format.

47. A method as defined in claim 39, further comprising applying each of an identity signature and a control signature to the video data.

48. A method as defined in claim 47 wherein the control signature comprises fragile control bits and robust control bits.

49. A method as defined in claim 47, further comprising embedding bits of the control signature into data blocks in accordance with a pseudo-random sequence that introduces a dependency among the blocks.

50. A method as defined in claim 49, further comprising:
extracting a data-dependent seed from at least one frame; and generating the pseudo-random sequence from the extracted seed.

51. A method as defined in claim 50, further comprising generating the seed for the pseudo-random sequence in accordance with a hash function.

52. A method as defined in claim 51 wherein the data-dependent seed is responsive to at least one DC coefficient.

53. A method as defined in claim 52, further comprising applying a coarse quantizer to the at least one DC coefficient prior to seed generation.

54. A method as defined in claim 53 wherein the at least one DC coefficient is selected from a plurality of data blocks having a DC coefficient value close to a quantization level of the coarse quantizer.

55. A method as defined in claim 47 wherein the identity signature and the control signature are applied to the video data concurrent with real-time acquisition of the video data.

56. A method as defined in claim 47 wherein the identity signature and the control signature are embodied in a single hybrid digital watermark.

57. A method as defined in claim 56, further comprising at least one of:
coding error-correcting signatures in the single hybrid digital watermark; and
embedding rate-distortion guided bits in the single hybrid digital watermark to achieve progressively varying robustness.

58. A method as defined in claim 39, further comprising verifying a control signature and an identity signature.

59. A method as defined in claim 58 wherein the identity signature and the control signature are extracted from a single digital watermark.

60. A method as defined in claim 39, further comprising:
verifying a control signature and an identity signature; and
displaying verified video data.

61. A method as defined in claim 60, further comprising producing an alert responsive to the presence of altered video content.

62. A method as defined in claim 41, further comprising detecting tampering in coordination with knowledge specific to the compression domain.

63. A method as defined in claim 62 wherein the compression domain comprises DCT encoded data.

64. A method as defined in claim 62 wherein the knowledge specific to the compression domain comprises at least one of spatial and temporal dependencies.

65. A method as defined in claim 62, further comprising:
assigning a likelihood value for possible tampering to each error block based its number of neighbors; and
temporally integrating the likelihood values to compute a score map indicative of potentially tampered regions.

* * * * *